United States Patent [19]

Meoni

[11] Patent Number: 4,734,143
[45] Date of Patent: Mar. 29, 1988

[54] PROCESS FOR THE PRODUCTION OF A CONTINUOUS COMPOSITE RIBBON INCLUDING AN ACRYLATE RESIN FILM TO BE USED IN SAFETY LAMINATED GLASS PANELS

[75] Inventor: Massimo Meoni, Ariccia, Italy

[73] Assignees: Societa Italiana Vetro Siv S.p.A., Chieti; Polivar S.p.A., Rome, both of Italy

[21] Appl. No.: 758,973

[22] Filed: Jul. 25, 1985

[30] Foreign Application Priority Data

Jul. 31, 1984 [IT] Italy ................ 48672 A/84

[51] Int. Cl.⁴ ............ B29C 39/12; B29C 35/08
[52] U.S. Cl. ................ 156/102; 156/242; 156/273.3; 156/275.5; 264/22; 264/25; 264/166; 264/236; 264/347; 425/174.4; 522/4
[58] Field of Search .......... 264/22, 236, 347, 25, 264/166; 425/174.4; 156/242, 99, 273.3, 102, 275.5; 522/4

[56] References Cited

U.S. PATENT DOCUMENTS

| | | | |
|---|---|---|---|
| 2,500,728 | 3/1950 | Williams | 264/22 |
| 2,537,970 | 1/1951 | Fields | 264/22 |
| 2,560,855 | 7/1951 | Flanagan | 425/174.4 |
| 2,579,138 | 12/1951 | Burness et al. | 264/22 |
| 2,590,186 | 3/1952 | Land | 264/175 |
| 3,383,448 | 5/1968 | Bader et al. | 264/166 |
| 3,600,490 | 8/1971 | Billingsley et al. | 264/213 |
| 3,978,178 | 8/1976 | Oshima et al. | 264/166 |
| 4,039,720 | 8/1977 | Cherenko et al. | 156/275.5 |
| 4,541,881 | 9/1985 | Sebastiano | 156/275.5 |
| 4,552,604 | 11/1985 | Green | 156/275.5 |

FOREIGN PATENT DOCUMENTS 0009885 5/1980 European Pat. Off.
0085602 1/1983 European Pat. Off.

Primary Examiner—Jeffery Thurlow
Attorney, Agent, or Firm—Browdy and Neimark

[57] ABSTRACT

A composite ribbon suitable for winding into coils, comprising an acrylate resin film destined to be used as an intermediate layer in safety glass panels, interposed between two thin protective films, is produced by means of a continuous process of polymerization induced by light radiation, using the two protective films themselves as a polymerization cell.

5 Claims, 1 Drawing Figure

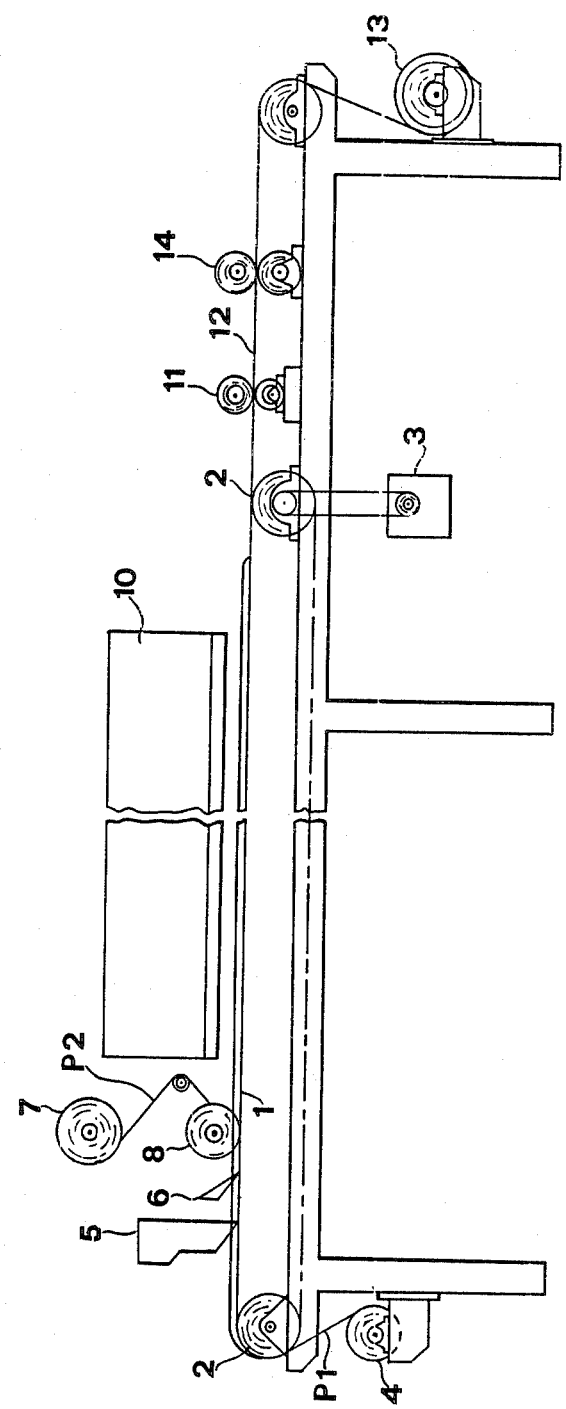

PROCESS FOR THE PRODUCTION OF A CONTINUOUS COMPOSITE RIBBON INCLUDING AN ACRYLATE RESIN FILM TO BE USED IN SAFETY LAMINATED GLASS PANELS

BACKGROUND OF THE INVENTION

1. Field of the Invention

The present invention relates to a process for the production, in industrial quantities, of an elastomeric film, particularly useful as an intermediate layer for safety laminated glass panels, said film being obtained as a composite continuous ribbon, interposed between two protective films, by means of a continuous process of polymerization of a mixture of acrylate resin in a closed polymerization cell, formed by the two protective films themselves, made of a transparent material. Safety glass panels presently in commerce are constituted generally of two layers of glass bonded by an intermediate layer of a plastic material.

In order to be defined as a safety glass, a glass article of manufacture must have a large capability of absorbing shock energy, a high tear and splitting strength in order to prevent the rupture of the intermediate layer of plastic material by the glass splinters, a sufficient adhesion between the layers for minimizing the scattering and projection of glass splinters, in the event of a breakage, and a high optical quality, in order to satisfy the regulations presently in force for such articles of manufacture.

2. Description of the Prior Art

In the prior art, as an intermediate plastic material, a more or less thick film of plastified polyvinyl butyral is used, that in the following will be identified with the acronym PVB.

Such a film is produced with processes per se known and equally known and largely utilized is the technology for using it in the manufacture of safety laminated glass panels.

There is however a strong trend to substitute PVB with other polymeric films, in order to reach the objective of appreciable reduction of the manaufacturing costs for laminated glass panels. Presently, indeed, the cost of the PVB film amounts to about 30-40% of the production costs of a safety laminated glass panel.

In the prior art several attempts have been made to obtain films as an alternative to PVB, obtained from compositions of different materials. U.S. Pat. Nos. 3,509,015, 3,764,457, 3,900,446 and 4,241,140 report examples of compositions of mixtures for obtaining intermediate layers of transparent polyurethane material, suitable to be utilized in safety laminated glass panels.

Also polymers based on vinyl chloride have been proposed. U.S. Pat. No. 4,389,508 provides, as an example, an intermediate layer constituted of a thermoplastic resin resulting from the polymerization of vinyl chloride (80-98.5%) and a glycidylmethacrylate, suitably mixed with a plasticizer.

It is also known from the prior art that it is possible to use as intermediate layers acrylic polymers as taught by French Pat. No. 2,101,083. In this French patent, however, the technique for obtaining the intermediate layer of acrylic resin consists in casting between the glass panels to be laminated said acrylic resin in liquid form, that subsequently polymerizes in situ. The known art provides therefore useful suggestions about how to obtain alternative products to PVB presently utilized in the large industrial productions of safety laminated glass panels (in particular wind shields for cars and glaze unit for buildings), however it does not result from the prior art how to produce, on industrial scale, elastomeric films in substitution of PVB both in the dimension of a large industrial production, and in the possibility of applying such films in the lamination of safety glass panels, according to technologies similar to those utilized for PVB. As a matter of fact, such alternative films of the prior art appear either produced in quantities industrially not relevant, or they require in practice to modify the industrial equipments for the production of the laminated glass panels arranged for the use of PVB, with clear increases of costs.

In particular this is the case of the cited French Pat. No. 2101083, that, even teaching the use of acrylic polymers as intermediate layers, entails large modifications in the technology for industrial scale production of safety laminated glass panels.

Insofar as the production of PVB films is concerned, the prior art uses a heat polymerization process and a subsequent extrusion of the film. Moreover, in order to avoid the self-bonding of the coiled film, the same film must be dusted with talc or powders, or be maintained under an atmosphere with a defined relative humidity and at a temperature below 0 centigrade degrees. U.S. Pat. Nos. 3,872,197, 3,988,098, 4,211,742 and French Pat. Nos. 2214716 and 2294038 disclose a continuous polymerization for obtaining rigid acrylic sheets having a thickness equal or greater than 2 millimeters. The polymerization is performed by thermal way between two endless conveyor ribbons that operate as a polymerization cell. The product is a rigid sheet, that cannot be coiled and that cannot be utilized as intermediate layer for safety galss panels.

SUMMARY OF THE INVENTION

According to the present invention there is provided a film of thermoplastic material based on acrylate resins, an alternative to PVB for the use as an intermediate layer in safety glass panels, that moreover is produced by means of a continuous photopolymerization process, the film being coiled into coils protected by two thin films adjacent to it, in order to avoid the problem of the self-bonding during the storage.

The two protective films are the same films that during the photopolymerization process constitute the mold for the acrylic film.

Object of the present invention is therefore a process for the production of a continuous composite ribbon, that can be wound as a coil, consisting of a transparent intermediate elastomeric film made of acrylate resin, having a thickness in the range between 0.4 and 2 millimeters, to be used as an intermediate layer for safety laminated glass panels, and two external layers made of a plastic resin transparent to visible infrared and ultraviolet light, which is inert to a polymerization reaction for forming said acrylate resin, and having a thickness under 50 micrometers, such process comprising the steps of: laying down in a continuous way a polymerizable mixture of acrylic monomers and, or methacrylic monomers or vinyl monomers on one of said external films; applying in a continuous way said second external film upon said mixture; polymerizing said composition to an acrylate resin by means of a first irradiation with a light radiation in the range of visible ultraviolet and infrared spectrum, wherein the radiation in the visible ultraviolet spectrum constitutes not more than 10% of the total irradiation, and by means of a second irradiation with a light radiation in the range of infrared spectrum, for a total period of time ranging from 45 minutes to 3 hours; and winding the so obtained composite ribbon into a coil.

A further object of the present invention is the composite ribbon obtained with the above mentioned process, as well as safety laminated glass panels including as an intermediate layer a film of transparent elastomeric acrylate resin of the above cited kind.

Consequently, according to the present invention a film is obtained suitable as an intermediate layer for safety glass panels, in substitution of PVB, having a thickness between 0.4 and 2 millimeters, a width of up to 2 meters, that moreover is easily coilable and may be transported without problems of self-bonding and of satisfaction of particular conditions of temperature and humidity during the storage. The film may be utilized in pre-existing plants, without introducing modifications, for the manufacture of safety glass panels.

BRIEF DESCRIPTION OF THE DRAWING

In the following several examples of embodiments of the present invention will be disclosed, making reference to the single FIGURE of the attached drawing that represents schematically an apparatus for the production of the composite ribbon, that realizes the process according to the invention.

DESCRIPTION OF THE PREFERRED EMBODIMENTS

A continuous conveyor belt 1 that receives movement from the rollers 2, 2' actuated by a motor 3, operates as a support for a transparent film P1 that is uncoiled from a coil 4.

Said transparent film P1 constitutes the bottom support over which the composition to be polymerized is cast uniformly. A feed tank 5 delivers the composition to be polymerized. The distribution and the metering of the composition are performed by means of a delivery hopper that adjusts the flow by means of an automatic pressure regulator (not represented) that permits that the composition be cast in a uniform and constant manner.

A thickness control doctor blade 6 provides to maintain constant the thickness of the composition on the film P1.

A coil 7 provides a second transparent film P2, that is laid upon the composition to be polymerized. A roller 8 that operates also as a tensioning idler for the film P2, provides for the fine thickness control and the coupling of the system comprised of P1, composition, P2.

Insofar as the transparent films are concerned, it has been found that polyethylenterephthalate with a thickness not greater than 50 micrometers is suitable for this purpose.

The lateral walls of the polymerization cell are folded over by inserting the edge ends of the two films P1 and P2 in two L-shaped guideways 9 perpendicular to the transport plane and located at the two ends, that provide to fold upwards the lateral ends and to maintain them adherent each other.

The two transparent films P1 and P2 consequently constitute the wall of a polymerization cell or mold that is paid off in a continuous way.

The polymerization cell, transported by the belt 1, enters into a polymerization tunnel 10 where the composition is subjected to polymerization by irradiation with light radiation.

It has been found that in order to obtain a product with physical-mechanical characteristic suitable for the intended use, the kind of irradiation must be of the mixed type: visible ultraviolet (UV) plus infrared (IR), where the percentage of visible UV should not be greater than 10% of the total.

After the polymerization step a cutter 11 provides for the trimming of the cell on both its sides.

The composite ribbon 12 constituted of the two external films P1 and P2, as well as of the internal polymerized film after a second IR irradiation, is coiled over a roller 13 and stored without any other particular measure.

In the drawing the rollers 14 indicate transport rollers for the composite ribbon 12.

Two acrylate compositions, hereinafter described, have been utilized as main components of the feed mixtures in a process according to the invention.

COMPOSITION A1

A mixture comprising, by weight:
90 to 100% and preferably 94 to 97% of acrylic and, or, methacrylic esters;
0 to 2% of acrylic or methacrylic acid;
0 to 5% of vinyl esters, in particular N-2-vinylpyrrolidone;
0 to 5% of acrylic and, or, methacrylic esters having hydroxyl groups and, or, glycidyl groups;
free radical type cartalysts of the azo and peroxy series;
is thermally partially bulk polymerized with a conversion between 3 and 25%. A part by weight of the above said mixture is dispersed in 0.16 to 1.2 parts and preferably in 0.9 to 1.1 parts by weight of a plasticizer compatible with the above said mono-polymeric systems, said plasticizer being a member of the class of derivatives or adipic acid, isophthalic acid, phthalic acid, sebacic acid, epoxy derivatives, polyester derivatives.

COMPOSITION A2

The acrylic mixture comprises by weight:
10 to 40% and preferably 18 to 35% of acrylic and, or, methacrylic polymers;
0 to 2% of acrylic or methacrylic acid;
0 to 5% of vinyl esters, preferably N-2-vinylpyrrolidone;
0 to 5% of esters of acrylic and, or, methacrylic acid having glycidyl groups;
60 to 90% and preferably 65 to 80% of acrylic and, or, methacrylic esters.

One part in weight of the above said mixture is dispersed in 0.16 to 1.2 parts by weight and preferably 0.9 to 1.1 parts by weight of a plasticizer compatible with the above said mono-polymeric systems, said plasticizer being a member of the class of derivatives of adipic acid, isophthalic acid, phthalic acid, sebacic acid and epoxy and polyester derivatives.

Production tests have been performed according to the process object of the invention with the above said mixtures, the characteristics of said tests being reported as an example in the following examples.

EXAMPLE 1

A mixture of the A2 type containing
1.5 parts by weight of glycidylmethacrylate, 1 part of N-2-vinylpyrrolidone,
2.5 parts of 2-ethylhexylacrylate, 1 part of butyleneglycoledimethacrylate,
45.5 parts of dibutylphthalate,
13.65 parts of polymethylmethacrylate,
31.85 parts of methylmethacrylate,
is additional to 3 parts of DAROCUR photoinitiator and 0.02 parts of bis-(4-t.butyl-cyclohexyl)-peroxydicarbonate and 0.01 parts of azo-bis-valeronitrile. Such mixture has been cast in continuous between sheets of polyethyleneterephthalate having a thickness not greater than 50 micrometers in order to form a resin of a thickness equal to 1+0.1 millimeters. The sandwich thus formed is passed through a first tunnel of mixed irradiation with visible UV+IR, where the UV irradiation has been equal to 5% of the total irradiation and a second IR tunnel, so that the total irradiation UV+IR is effectd for a time of 90 minutes.

The resulting film, after having been freed of the protection film of polyethylenterephthalate, that had constituted the polymerization cell, has been placed between two glass plates of 300×300 millimeters, each 2.5 millimeters thick, and the resulting sandwich, after having been subjected to a press, has been placed in autoclave under a pressure of 10 ATE and a temperature of 110 centigrade degrees for 1 hour.

Having performed the tests prescribed by the regulations on 10 specimens, positive results have been obtained according to rule ECE 43.

EXAMPLE 2

A mixture of the A2 type containing
47 parts of dioctyphthalate,
16,67 parts of polymethylmethacrylate,
33.84 parts of methylmethacrylate,
has been additioned to 2.5 parts of IRGACUR photoinitiator and it has been continuously cast and thermo-photopolymerized as in example 1, with an UV irradiation corresponding to 10% of the total and with a total polymerization time corresponding to 60 minutes.

The resulting film, after having been freed from the protective film, has been placed between two glass plates of 300×300 millimeters and 2.5 millimeters in thickness, previously coated with a silane primer.

The sandwich has been initially subjected to a press and then placed inautoclave under 11 Ate and 120 centigrade degrees for 2 hours.

The results of the tests performed on 10 specimens have been positive according to rule ECE 43.

EXAMPLE 3

A mixture like the one disclosed in example 2, but containing also 0.01 parts of methacrylic acid, has been continuously cast and thermo-photopolymerized as disclosed in example 2 for a total polymerization time corresponding to 150 minutes.

The resulting film, after having stripped it of the protective film, has been placed between glass plates of 300×300 millimeters and 2.5 millimeters of thickness and the resulting sandwich, after having been subject to a press, has been placed in autoclave under 7 Ate and 110 centigrade degrees for 2 hours.

Also in this case the specimens subjected to tests gave positive results according to rule ECE 43.

EXAMPLE 4

A mixture of the A1 type containing
47 parts of dioctylphthalate,
50.4 parts of methylmethacrylate,
previously pre-polymerized, in the presence of 100 ppm of bis-(4-t.-butyl-cyclohexyl)-peroxy-carbonate and 100 ppm of azo-bis-valeronitrile and 100 ppm of laurylmercaptane, up to a conversion degree of 13%, after having been additioned with 2.5 parts of IRGACUR photoinitiator, has been treated as in foregoing example. The tests performed on 5 specimens gave a positive according to rule ECE 43.

The invention resolves therefore the problem of producing with low costs and on industrial scale a film obtained from acrylate resin, suitable for safety laminated glass panels, that can also be easily transported and stored.

By means of the present invention the result is obtained of introducing on the market a product alternative to PVB and less costly than this one, even maintaining unchanged the process that presently is utilized in laminating safety glass panels with PVB.

I claim:

1. A method of producing safety glass, comprising the steps of:
    polymerizing in the form of a continuous ribbon, a mixture of polymerizable monomers including:
    (A) one part by weight of a composition of polymerizable monomers including 60 to 97 parts by weight acrylic or methacrylic ester, 0 to 2 parts by weight acrylic or methacrylic acid, 0 to 5 parts by weight N-2-vinylpyrrolidone, 0 to 5 parts by weight acrylic or methacrylic acid ester including glycidyl groups;
    (B) 0.16 to 1.2 parts by weight of a plasticizer selected from the class consisting of adipic acid, isophthalic acid, phthalic acid, sebacic acid, epoxy derivatives and polyester derivatives; and
    (C) an effective amount of a catalyst of the azo or peroxy series, between a pair of transparent films of plastic material inert to said polymerizing and transparent to infrared and visible ultraviolet light by exposing said polymerizable mixture between said films to a first irradiation with light in the infrared and visible ultraviolet spectrum range and then subsequently exposing said polymerizable mixture between said films to a second irradiation with light in the infrared spectrum range absent light in said visible ultraviolet range, the amount of visible ultraviolet irradiation to which said polymerizable mixture is exposed being no more than about 10% of the total irradiation, the mixture of polymerizable monomers being irradiated for a total of 45 minutes to 3 hours, so as to form a covered elastomeric polymerized resin sheet;
    removing both of said films from said covered elastomeric polymerized resin sheet to form an uncovered elastomeric polymerized resin sheet;
    bonding said uncovered elastomeric polymerized resin between two sheets of glass adjacent top and bottom surfaces of said uncovered polymerized resin sheet to form a safety glass.

2. The method of claim 1, further comprising the steps of winding said covered elastomeric polymerized resin sheet into a coil and unwinding said coil prior to the step of removing said films.

3. A process according to claim 1, wherein said transparent plastic resin forming said external films is selected from the class consisting of polypropylene, polyethylene, polyamide, polyester, polyethylenterephthalate.

4. A method of producing a continuous sheet of polymerized resin, comprising the steps of:
  polymerizing in the form of a continuous ribbon, a mixture of polymerizable monomers including:
  (A) one part by weight of a composition of polymerizable monomers including 60 to 97 parts by weight acrylic or methacrylic ester, 0 to 2 parts by weight acrylic or methacrylic acid, 0 to 5 parts by weight N-2-vinylpyrrolidone, 0 to 5 parts by weight acrylic or methacrylic acid ester including glycidyl groups;
  (B) 0.16 to 1.2 parts by weight of a plasticizer selected from the class consisting of adipic acid, isophthalic acid, phthalic acid, sebacic acid, epoxy derivatives and polyester derivatives; and
  (C) an effective amount of a catalyst of the azo or peroxy series, between a pair of transparent films of plastic material inert to said polymerizing and transparent to infrared and visible ultraviolet light by exposing said polymerizable mixture between said films to a first irradiation with light in the infrared spectrum and visible ultraviolet range and then subsequently exposing said polymerizable mixture between said films to a second irradiation with light in the infrared spectrum range absent light in said ultraviolet range, the amount of visible ultraviolet irradiation to which said polymerizable mixture is exposed being no more than about 10% of the total irradiation, the mixture of polymerizable monomers being irradiated for a total of 45 minutes to 3 hours, so as to form a covered flexible elastomeric polymerized resin sheet.

5. The method of claim 4, further comprising the step of removing both of said films from said covered elastomeric polymerized resin sheet to form an uncovered elastomeric polymerized resin sheet.

* * * * *